Oct. 17, 1961 T. P. LEWIS ET AL 3,004,585
APPARATUS FOR MAKING TAPE REINFORCED PLASTIC PIPE
Filed Oct. 8, 1956 4 Sheets-Sheet 3
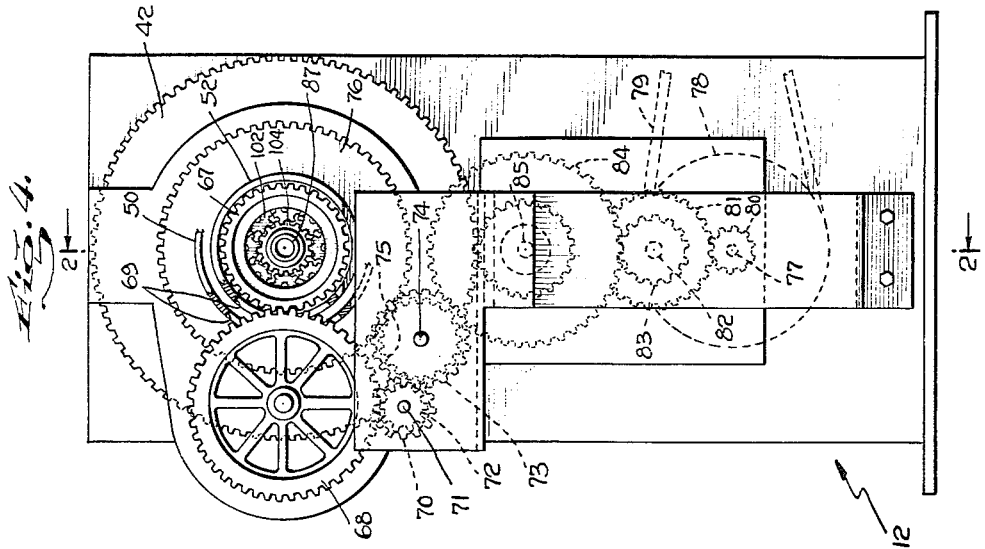
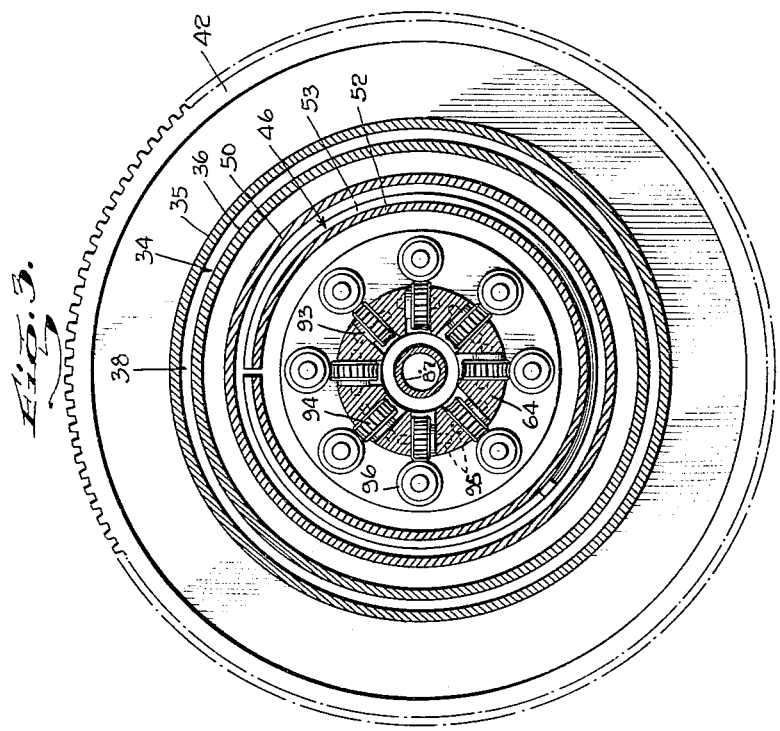
INVENTORS
THOMAS P. LEWIS
DOV HENIS
BY Hubbell and Cohen
ATTORNEYS Oct. 17, 1961  T. P. LEWIS ET AL  3,004,585
APPARATUS FOR MAKING TAPE REINFORCED PLASTIC PIPE
Filed Oct. 8, 1956  4 Sheets-Sheet 4
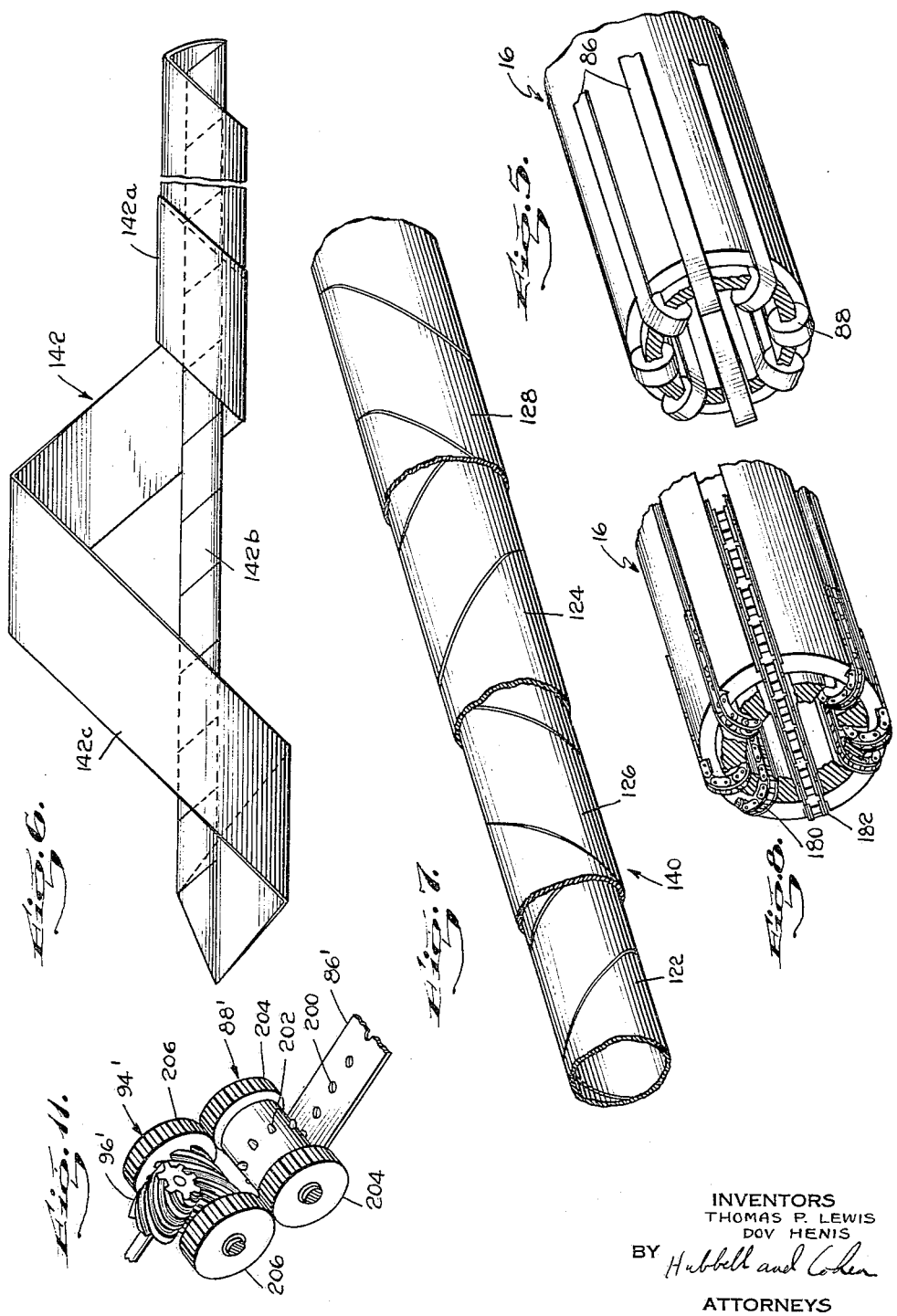
INVENTORS
THOMAS P. LEWIS
DOV HENIS
BY Hubbell and Cohen
ATTORNEYS

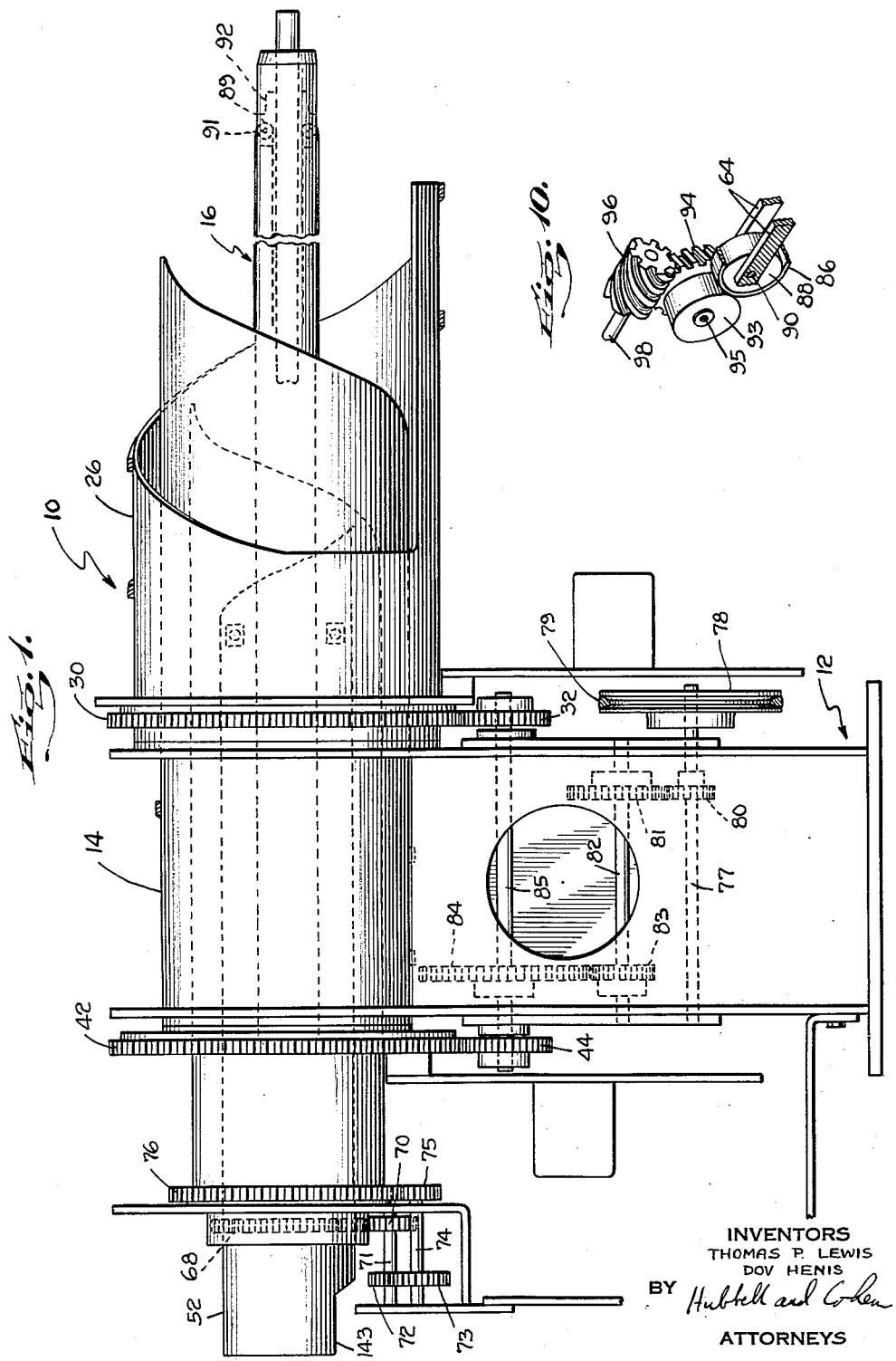

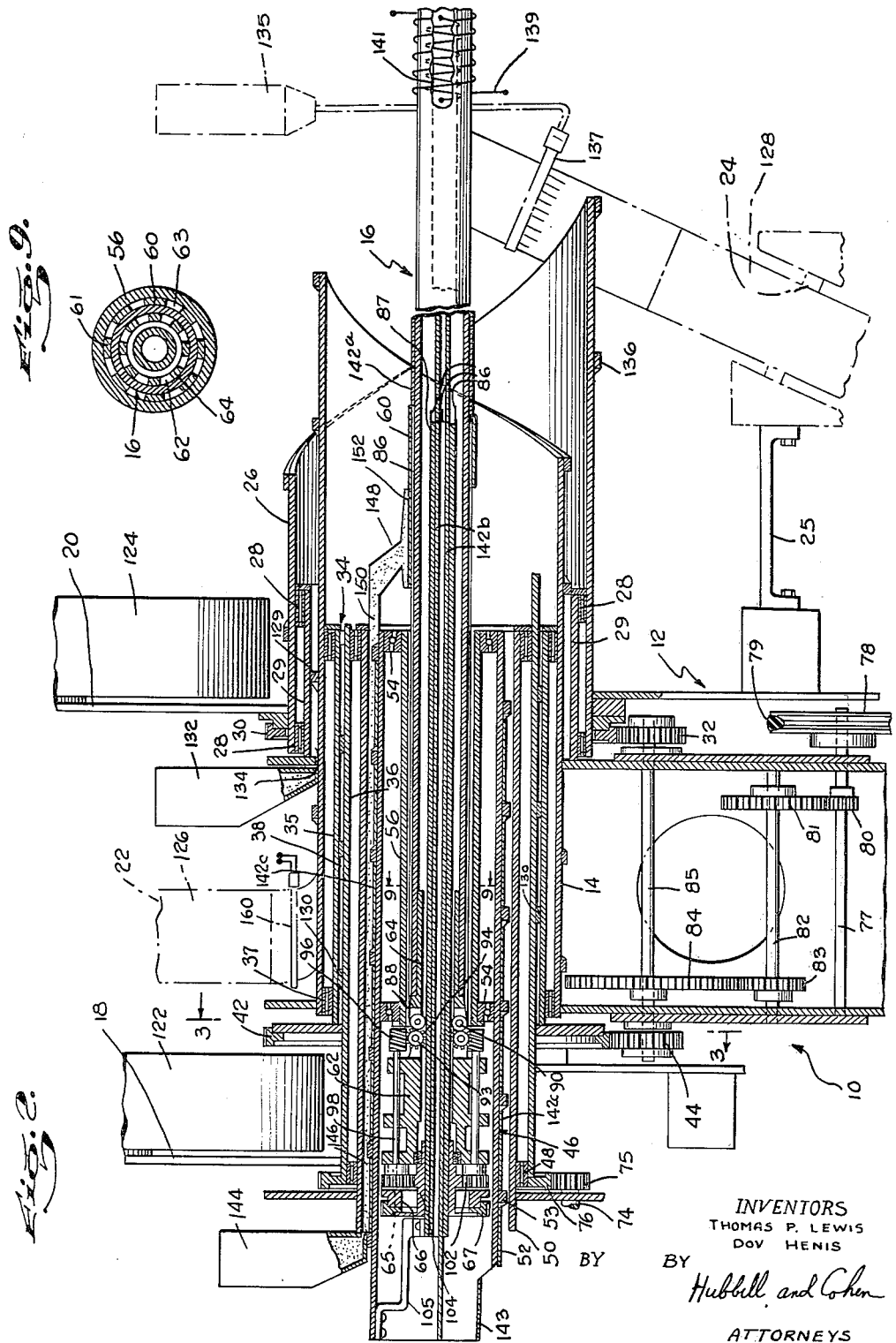

United States Patent Office 3,004,585
Patented Oct. 17, 1961

---

3,004,585
APPARATUS FOR MAKING TAPE REINFORCED PLASTIC PIPE
Thomas P. Lewis, North Apollo, and Dov Henis, Pittsburgh, Pa., assignors to Myron Cohen, New York, N.Y.
Filed Oct. 8, 1956, Ser. No. 614,729
8 Claims. (Cl. 156—429)

This invention relates to a method and apparatus for making reinforced plastic hollow members and more particularly for making fiberglass reinforced plastic hollow members such as pipes, conduits and so forth, which may either be circular in cross section or in some polygonal form. Most particularly, the invention relates to a method for making fiberglass reinforced plastic pipe.

Fiberglass reinforced plastic pipe has been known heretofore and its highly desirable properties have been fully appreciated. Among the advantages of using fiberglass reinforced plastic pipe, hereinafter referred to as plastic pipe, are the ease of handling due to the lightweight, the corrosion resistance and the ease of connecting sections of said pipe together. Unfortunately, the advantages of plastic pipe have not been fully realized because of the present excessive cost of manufacturing such pipe. The major reason for the prohibitive cost of such pipe is due to the fact that no simply automatic method has been devised for its manufacture.

Initially, plastic pipe was made by winding plastic impregnated reinforcing tape on a slightly tapered cylindrical form, curing the plastic and thereafter removing the cured pipe from the cylindrical form. This was a completely manual operation and the costs of labor were so high as to render the ultimate price of the finished product prohibitive. Moreover, the pipe took on the slight taper of the form. Subsequently, machines were developed which automatically wind plastic impregnated fiiberglass tape onto a mandrel. Although such machines reduce the cost of manufacturing plastic pipe, it is still necessary to manually remove the plastic pipe from the madrel and often this removal is effected by disengaging the mandrel from the winding machine and thereafter removing the pipe therefrom. A new mandrel is then substituted for the one on which the pipe has been formed.

In addition to the excessive costs of the method hereinbefore described, it will be obvious that by using such methods plastic pipe could only be made in discrete lengths, the length being determined by the length of the mandrel.

Another method of manufacturing plastic pipe is by a slush casting method which has been ordinarily used to make large diameter pipes. Unfortunately, the slush casting method is completely unsuitable for making anything but very short lengths of pipe and this method of manufacturing the short lengths of pipe is extremely expensive.

The present invention is directed primarily to the provision of a new machine which will manufacture reinforced plastic pipe or tubing at extremely low cost and this is the major object of the present invention.

Another object of the present invention is the provision of a new machine for manufacturing plastic pipe which is adapted to make a continuous pipe of any desired length, be it feet or miles.

A further object of the present invention is the provision of apparatus for making plastic pipe which will have an extremely smooth interior surface to thereby reduce friction between it and the fluids flowing therein.

Still another object of the present invention is the provision of a fully automatic machine to manufacture plastic pipe.

Yet a further object of this invention is the provision of a novel mandrel which has a continuously progressively movable surface to advance plastic pipe lengthwise therewith and thus form a means of manufacturing plastic pipe of indefinite length.

The above and other objects, characteristics and features of the present invention will be more fully understood from the following description taken in connection with the accompanying illustrative drawings.

In the drawings:

FIG. 1 is a side elevational view of an automatic machine for making fiberglass reinforced plastic pipe in accordance with the present invention;

FIG. 2 is a longitudinal sectional view of a portion of the machine shown in FIG. 1;

FIG. 3 is a sectional view taken along the line 3—3 of FIG. 2;

FIG. 4 is an end elevational view of the machine shown in FIG. 1 with parts broken away to more clearly illustrate other parts of said machine;

FIG. 5 is an enlarged fragmentary perspective view of portions of the mandrel included in the machine forming the present invention;

FIG. 6 is a diagrammatic view of the path of movement of a flexible wrapper forming a part of the present invention;

FIG. 7 is a perspective view with parts broken away illustrating the product forming the present invention;

FIG. 8 is a view similar to FIG. 5 illustrating another form of the present invention;

FIG. 9 is a sectional view taken along the line 9—9 of FIG. 2;

FIG. 10 is a fragmentary perspective view illustrating details of a portion of the drive means included in the present invention; and FIG. 11 is a view similar to FIG. 10 showing another modification of the present invention.

Referring now to the drawings in detail, the machine for making fiberglass reinforced plastic pipe is generally designated by the reference numeral 10. This machine comprises a stationary base 12 having a cylindrical portion 14 extending transversely of the base and acting as a support for the various elements of the machine. Supported directly and indirectly by the base portion 14 is a rotating mandrel 16, a pair of movable spool holders 18 and 20, and a fixed spool holder 22. A fixed spool holder 24 is supported by a base 12 through a bracket 25. The spool holders are adapted to hold spools or reinforcing tape and to supply said tape to be wrapped around said mandrel, whereby to form a reinforcing network for a plastic pipe. The reinforcing tape may be any suitable flexible type of material and fiberglass is presently preferred. Most preferably, the tape is a fiberglass roving, although a woven fiberglass may be used as well as rovings and woven tapes of other reinforcing materials. The reasons why we presently prefer a roving will become more apparent as this description proceeds.

The movable spool holder 20 is fixed to a cylindrical sleeve 26 which is rotatably mounted on the cylindrical base part 14 as by bearings 28 carried by a bearing support 29 fixed to base 12. A gear 30 is fixed to sleeve 26 and is in meshed relationship with a drive gear 32 which imparts rotary movement to gear 30 and hence to sleeve 26, whereby to impart rotary movement to spool holder 20. Another sleeve 34 is movably mounted concentrically of the base 14 and is disposed within the cylindrical portion 14 of the base 12. As shown herein, sleeve 34 has two spaced concentric cylindrical portions 35 and 36, portion 35 being in operative engagement with bearings 37 which also engage stationary part 14 of base 12. The space between cylindrical portions 35 and 36 is designated 38 which provides a passage for the fiberglass roving carried by the spool holder 18 mounted on cylindrical part 36. The sleeve 34 carries a gear 42 mounted at the left hand end of part 35, which is in meshed relationship with a drive gear 44 to impart rotary movement to the spool holder 18 and to sleeve 34. As will become clear hereinafter, spool holders 18 and 20 preferably rotate at the same angular velocity.

Disposed concentrically within the sleeve 34 and spaced therefrom is another fixed cylindrical member 46 which is separated from the sleeve part 36 by bearings 48. Fixed cylindrical member 46 is actually made up of two fixed cylindrical members 50 and 52 which are concentric and which are spaced from one another by guide ridges 53 to provide a channel or path for a flexible wrapper and a separator therefor as will be described in more detail hereinafter. Mounted on the inner cylindrical part 52 of cylindrical members 46 are ball bearings 54, the outer races of said ball bearings being connected to the stationary cylindrical member 52 and the inner races thereof being connected to a fixture 56 which surrounds and is connected to a longitudinally extending rotatable pipe or cylindrical member 60 forming part of the mandrel 16. Fixture 56 is in fact a cylindrical shaft having internal ridges or splines 61 extending longitudinally thereof, the free surfaces of said splines being fixed to the external surface of tube 60 in any suitable manner so that the two parts rotate in unison (see FIG. 9). The splines 61 define therebetween passages 63 for a purpose which will become clear as this description progresses.

The longitudinally extending pipe 60 is the basic forming element for the plastic pipe to be made by the machine 10. The length of the pipe 60 is not critical but as will become apparent hereinafter, pipe or tubular member 60 must be sufficiently long to give the plastic pipe which is formed thereon an opportunity to be at least partially cured prior to removal therefrom in a manner to be described hereinafter in order to be able to maintain its form. Tubular member 60 is rotated through the medium of a fixture 62 which is fixedly connected to the tube 60 by means of tines or fingers 64 which are pressed fit internally into the tube 60. The fixture 62 is provided with a plurality of outwardly extending fingers or finger portions 65 which are fixedly connected to an adapter 66 in the form of a continuous ring. Carried by the adapter 66 is a ring gear 67.

Referring now to FIG. 4, the ring gear 67 is in meshed relationship with a spur gear 68 which extends through registered slots 69 in cylindrical portions 50 and 52 of sleeve 46. Gear 68 is driven by a spur gear 70 mounted on a shaft 71 which has provided thereon another spur gear 72 which rotates in unison with the gear 70. Gear 72 is driven by a gear 73 mounted on a shaft 74 which carries a gear 75 which rotates in unison with the gear 73. Gear 75 is in meshed relationship with a ring gear 76 which is fixed to sleeve 34 and rotatable therewith. As shown in FIG. 2, ring gear 76 is located adajcent the extreme left hand end of sleeve 36. By employing the train of gears as described above, when gears 32 and 44 rotate in a manner to be described presently, rotation is imparted to sleeves 34 and 26 and from sleeve 34 through the last mentioned gear train including elements 67 to 75, adapter 66 is rotated and thereby imparts rotary movement to fixture 62 and tube 60 forming the main portion of mandrel 16. To impart rotary movement to gears 32 and 44, a main drive shaft 77 carrying a pulley 78 is mounted on base 12. Pulley 78 is driven by a belt 79 from a suitable motor means (not shown) to rotate the main shaft 77. Carried by the main shaft 77 is a spur gear 80 which is in meshed relationship with another spur gear 81 mounted on a shaft 82 which is also carried by the base 12. Fixed to the shaft 82 is another spur gear 83 which is in meshed relationship with a spur gear 84 carried by a drive shaft 85. Gears 32 and 44 are fixed to the shaft 85 and, accordingly, they rotate in unison with the gear 84. In this manner power is provided from the motor means to the plurality of rotatable elements in machine 10.

In accordance with one highly desirable feature of the present invention, means are provided on the surface of the forming member or tubular member 60 which move longitudinally of said tubular member. Accordingly, and as will become more apparent hereinafter, when the plastic impregnated fiberglass roving is wound onto the mandrel 16, it moves longitudinally thereof and by suitable heating means is cured while moving longitudinally of said mandrel and after being cured is moved off said mandrel, whereby to provide for a continuously formed pipe unachieved heretofore. As shown herein and as is presently preferred, the movable means on the mandrel 16 comprises a plurality of continuous flexible members here shown as continuous ribbons 86 which extend longitudinally of the pipe 60 along the outer surface thereof and also extend through said tubular member 60 between it and the outer surface of a fixed tubular member 87. Other flexible members such as chains or belts may be used. The plurality of ribbons 86, here shown as eight in number, engage at each end roller means, shown in FIGS. 1, 2, 3, 5 and 10 as rollers 88 and 89 although chain sprockets or other roller means may be employed. Rollers 88 and 89 are operatively rotatably mounted on the tubular member 60. As shown herein, particularly in FIG. 10, the rollers 88 are rotatably mounted on axles 90 which extend between adjacent spaced arms 64 of the fixture 62. The rollers 89 are rotatably mounted on axles 91 which are mounted in a suitable fixture 92 fixed to the right hand end of the tubular member 60. In a manner to be described below, the rollers 88 are positively driven to thereby rotate and move the ribbons 86 longitudinally of the tubular member 60, the rollers 89 acting as guide and idler rollers. The ribbons 86 pass between rollers 88 and 89 through passages 63 defined by splines in fixture 56. The direction of rotation of the rollers 88 is such that the portions of the ribbons 86 overlying the outer surface of the tubular member 60 move in a rightwise direction as viewed in FIG. 2.

In order to rotate the driver rollers 88, driver rollers 93 are in frictional engagement with the portions of the ribbons 86 in engagement with the driver rollers 88. The rollers 93 have integrally formed thereon a worm gear 94, the entire assembly rotating on axles 95 extending between the arms 64 of the fixture 62. The worm gears 94 are in meshed relationship with worm wheels 96 which are fixed to shafts 98 rotatably mounted in the fixture 62. Fixed to the left hand ends of the shafts 98 are planetary gears 102 which are all in meshed relationship with a sun gear 104 fixed to a fixed tubular member 87. Accordingly, when the motor means is actuated to operate the gear trains aforedescribed to thereby impart rotary movement to the tubular member 60 and fixture 62 about their longitudinal axes, planetary gears 102 will rotate therewith about the axis of fixture 62 and due to their engagement with the fixed sun gear 104 will rotate about their own axes to impart rotary movement to the shafts 98 about their respective longitudinal axes, whereby to rotate worms 96 about their respective axes, and thereby impart rotary movement to worm gears 96 to rotate drive rollers 93 and thereby impart rotary movement to rollers 88 and linear movement to the ribbons 86. To maintain hollow shaft 87 fixed, a bracket 105 is fixed at one end to fixed shaft 87 and fixed at its other end to fixed sleeve portion 52 of sleeve 46. By means of the gear drives aforedescribed, spools 18 and 20 are preferably caused to rotate at twice the angular velocity of the tube 60 and in the same direction. The purpose for this will become clear hereinafter. Suffice it to say at this point that many other types of drive mechanisms may be employed and the present invention is not limited to the one illustrated in FIG. 3. Moreover, as will become apparent as this description progresses, the ratio of speeds of the spool holders to the mandrel is not necessarily 2:1 and other suitable ratios may be employed.

As stated hereinbefore, in the mechanism 10 illustrated in the drawings there are four spool holders 18, 20, 22 and 24, spool holders 18 and 20 being rotatable about the longitudinal axis of the mandrel 16 at twice the rotational speed thereof and spool holders 22 and 24 being stationary. Each of the spool holders 18, 20, 22 and 24 is adapted to carry a spool of fiberglass roving 122, 124, 126 and 128, respectively, said spools being rotatably mounted in said spool holders. The fiberglass roving 122 is brought onto the mandrel 16 in a spiral path extending from the spool holder 18 to the mandrel 16 around the inner cylindrical part 36 of the rotatable cylindrical member 34, it being disposed in the space 38 between the cylindrical parts 35 and 36 of the sleeve 34, the path being defined by a helical guide ridge 130. The fiberglass roving 126 which comes off the stationary spool holder 22 is brought onto the mandrel 16 in a spiral path in which the roving 126 overlies the outer surface of the stationary cylindrical part 14 of the base 12 in helical form defined by helical guide ridge 129. Resin from a reservoir 132 is supplied to roving 126 through a passage 134. Roving 124 passes off the spool 20 and winds around sleeve 26 in a helical path defined by helical guide ridge 136. From the sleeve 26 the roving moves onto the mandrel 16 on which it is wound in the form of a helix. The roving 128 which is supplied from spool holder 24 which is fixedly supported by base 12 is wound directly from the spool holder 24 to the mandrel 16. In passing from the spool holder to the mandrel, the roving 128 comes into close relationship with a suitable resin supply 137 which is supplied by resin reservoir 135 to impregnate roving 128.

As is clearly shown in FIG. 2, roving 122 which is not impregnated with resin, is the first or bottom layer of the pipe laid down onto the mandrel 16. Since, with the motor means energized, the surface of the mandrel for all intents and purposes is moving longitudinally thereof due to the movement of the ribbons 86 and is rotating at a given angular velocity and roving 122 is rotating with sleeve 34 at twice said angular velocity and in the same direction, the roving 122 is formed onto the mandrel in a spiral wound in a given direction. The parts are proportioned to move at such speed that the edge of the roving is disposed at an angle to the vertical which is substantially equal to 26°34'. Assuming the roving is three inches wide, it will be desired that 3.82 convolutions of the spiral will be laid onto the mandrel per foot with about ⅛ inch overlap on each adjacent convolution. These figures are presented as being the most desirable for reasons of strength as will be described more clearly subsequently, and it will be obvious that other speeds and angular dispositions may be selected if desired.

The second layer of the pipe is formed of a spiral extending in the opposite direction or being angularly related to the spiral defined by the roving 122 and being disposed also at an angle of 26°38' to the vertical. The second layer, formed of the roving 126 is, as stated hereinbefore, impregnated with plastic or resin, the impregnation being to a sufficient degree so that when the roving 126 is wound onto the mandrel and overlies the roving 122, resin from the roving 126 flows into the roving 122 to impregnate the latter. Roving 126 is fed to the mandrel from a stationary means whereby the spiral it forms on mandrel 16 is wound in the opposite direction to the spiral formed by roving 122. The forming of the plastic pipe 140 with the additional two layers 124 and 128 is substantially the same as that for layers 122 and 126 whereby to make a four-ply pipe 140 with all of the convolutions disposed at angles to the vertical substantially equal to 26°34', and the resin from the rovings 126 and 128 causing resin impregnation of the rovings 122 and 124. As stated above, two of the layers are wound in one direction and the other two layers are wound in the opposite directions. It will be seen that as the rovings are laid onto the mandrel, due to the longitudinal movement of the ribbons 86, the spirally wound rovings will move to the right as viewed in FIG. 1. As they move to the right they will be subjected to heat from a suitable heating means 139 in close proximity to the mandrel, whereby to cure the resin and after curing the plastic pipe 140 continues to move longitudinally of the mandrel and off the mandrel, whereby to make room for additional lengths of the same pipe 140. It will be seen therefore that the pipe 140, since it is constantly moving to the right due to the movement of the ribbons 86, can be made as long as is desired, there being no limits since when the spools for the several rovings are exhausted, new rovings can be secured thereto, and as the resin reservoir is depleted additional resin may be supplied thereto also.

As stated hereinbefore, we presently prefer to use a roving rather than a woven tape. We choose a roving since with all the fibers extending in the same direction we achieve far greater strength in a peripheral direction than can be achieved with a like amount of material in a woven tape.

Moreover, we presently prefer to wind the roving at angles of 26°34' to the vertical because at this angle the reinforcing roving tends to give twice the reinforcement in the peripheral direction than is given in the longitudinal direction and since plastic pipes of the type shown in FIG. 7 and designated 140 are normally subjected to much greater peripheral stresses than to longitudinal stresses, a light weight pipe of suitable strength can be achieved when the rovings are disposed at said angles. Of course, if peripheral strength is not a critical factor, other angles may be used.

The resin utilized to manufacture the plastic pipe may be any suitable thermosetting or thermoplastic resin which is liquid in its unset state. We presently intend to use epoxy resins and polyester resins and polyester resins are presently preferred. It will be obvious that the heating means 139 surrounding the mandrel for curing the resin must be able to subject the pipe 140 to sufficiently high temperatures to cure the type of resin being employed and should be long enough, taking into account the linear speed of ribbons 86, to fully cure the resin.

An alternative means for heating pipe 140 to effect the curing of the resin is to provide in addition to heating means 139, an internal heating means 141 disposed between rotating member 60 and fixed member 87. Heating means 141 is preferably designed to heat the inner portion of pipe or tube 140 to a slightly higher temperature, of the order of 50° F., than the heating means 139 heats pipe 140. This will cause a flow of the resin toward the innermost layer of fiberglass roving to render said layer resin-rich. The concentration of resin in the innermost layer will render said layer highly resistant to corrosion whereby to greatly increase the life of the pipe 140.

The embodiment of the invention described hereinbefore will operate in the described manner. However, there are a number of disadvantages to this construction which can be obviated by the addition of a flexible wrapper 142 in a manner to be described presently. The disadvantages of the structure described above result from the fact that if the bottom layer or roving 122 is wound directly onto the plurality of longitudinally movable ribbons 86, there will be of necessity an irregular inner surface in the pipe 140, which irregular surface will tend to increase the amount of friction to fluid flow therein. Moreover, there is a distinct possibility of clogging due to resin getting between the outer surface of the longitudinally extending tubular member 60 and the ribbons 86, whereby to prevent efficient operation of the mechanism or possibly to discontinue operation entirely.

In order to obviate these difficulties, and as stated hereinbefore, a flexible wrapper 142 is used. The flexible wrapper may be of any suitable material which will not adhere to the resin, but preferably the flexible wrapper is made of steel. The flexible wrapper is wound onto the mandrel 16 to overlie the ribbons 86 in an overlapping spiral, whereby to prevent any resin from coming in contact with the ribbons or the longitudinally extending tubular member 60. If desired, the wrapper may merely be carried on a spool and taken off the spool due to the rotation of the mandrel and gathered up at the opposite end of the mandrel by another spool which rotates at a suitable angular velocity. It will be obvious from a perusal of FIG. 6 that the wrapper 142 underlies the bottom layer of fiberglass roving 122 and thereby separates it from the ribbons and tubular member 60. Since the wrapper 142 may be extremely thin, the overlap from convolution to convolution will cause little surface irregularity on the inner surface of the pipe 140 and thereby give it excellent flow characteristics as well as to prevent clogging of the mechanism with the resin. Although the metal wrapper does not readily adhere to the resin, in order to insure no fouling of the metal wrapper, a suitable separator is supplied to the wrapper prior to the wrapper coming into engagement with the bottom layer 122 of roving. This separator is supplied from a separator supply reservoir 144 through a channel 146 extending between the two fixed tubular portions 50 and 52 of the sleeve 46. At the right hand end of the channel 146 is an applicator 148 which has a passage 150 extending from the channel 146 to a suitable pad 152 which may be made of felt, foam rubber or other like material. The pad 152 engages the wrapper 142 as it is first wound onto the mandrel 16 at the left hand end thereof and coats it with a suitable separator such as a silicone grease in order to prevent adhesion of the wrapper to the resin. Although silicone grease is preferred, other hydrocarbon greases may be employed.

As is now presently preferred, in lieu of a hydrocarbon grease separator, wrapper 142 is thinly permanently coated with polytetrafluoroethylene, polytrifluorochloroethylene, or other similar material. Materials of this type are inert and thereby act as an ideal separator. Moreover, once the wrapper is coated with such material, the need for a separator supply is obviated, thereby eliminating the expense of providing such supply and the need for periodically refilling the separator reservoir. If desired, wrapper 142 may be made wholly of polytetrafluoroethylene, polytrifluorochloroethylene or the like.

Although the manner of supplying and withdrawing the wrapper 142 from the mandrel 16 as described above will operate satisfactorily, it has the shortcoming of requiring a shutdown of the machine each time a spool of wrapper is exhausted whereby to prevent continuous automatic manufacture of pipe. To obviate this shortcoming and as one of the highly desirable features of the present invention, we have devised a continuous wrapper. The path of movement of the continuous wrapper will now be described: Starting from the applicator 148 the wrapper is wound spirally about the mandrel in overlying relationship with the ribbons 86 and naturally moves with said ribbons longitudinally of the mandrel. At the extreme right hand end of the mandrel where the wrapper will tend to move off the mandrel 16 and separate from the pipe 140 being formed thereon, the wrapper is directed through open right hand end of tube 87 into the interior of said tube 87. In so directing the wrapper it is wound into a spiral in which the convolutions extend in the opposite direction to that portion of the wrapper overlying the mandrel. In FIG. 6 the spirally wound portion of the wrapper 142 overlying the mandred is referred to as 142a and the reversely wound wrapper portion disposed within the shaft 87 is designated 142b. The portion 142b extends the entire length of the hollow shaft 87 interiorly thereof and moves to the left relative thereto in a manner which will become clear presently. At the left hand end of the portion 142b of wrapper 142, the wrapper passes out of the shaft 87 through the left hand end opening thereof. From the left hand opening the wrapper passes through a cut-out portion 143 in part 52 of sleeve 46 to helical guide ridge 53 defined on the inner part 52 of the fixed cylindrical member 46. This helical guide ridge guides the wrapper around said portion 52 to the right hand end thereof where the wrapper 142 extends upwardly to the separator. All the various movements of the continuous wrapper are imparted thereto due to the longitudinal movement of the portion 142a in the rightwise direction as imparted by the ribbons 86. Since the portion 142a is constantly moving to the right, it will require replacement from the portion of the ribbon designated 142c which is disposed in the helical groove 53 and since the portion 142c will accordingly move longitudinally of said groove, it will constantly draw the spirally wound portion 142b to the left, thereby constantly supplying a new portion of the wrapper to make it the part 142c. In this manner wrapper need never be replaced or made up with additional spools and so forth, the wrapper 142 becoming an integral part of the apparatus.

Referring now to FIG. 8, a modification of the present invention is illustrated. In this modification the roller means disposed at both ends of the mandrel 16 are rotatable sprockets 180 which are in operative engagement with a plurality of suitable chains 182 having portions extending over the surface of tubular member 60 and other portions extending through the interior of tubular member 60. The chains operate as continuous flexible members in much the same way as do the ribbons 86 described above. The manner for imparting movement to the driver sprockets 180 may be similar to that employed for the driver rollers 88 described above with necessary modifications well within the ability of those skilled in the art. It is believed that the operation of this modification is clear from the description of the operation of the embodiment including the ribbons 86. It should be noted that when employing a mandrel 16 having chains extending along the surface thereof, it is practically mandatory to employ a wrapper such as wrapper 142 since the surface irregularities of any finished product made on a machine not including said wrapper would make the product commercially undesirable. It may be desirable to disppose the upper portions of the chains 182 within longitudinal recesses in the mandrel whereby to render the upper surfaces of the chains 182 just a slight bit out of flush with the surface of the tubular member 60. One of the major advantages to employing chains as the continuous flexible member in lieu of ribbons is that an increased amount of power may be supplied thereto to effect smooth undisturbed movement of a heavy pipe 140.

Referring now to FIG. 11, another modification of the present invention is illustrated. In this modification the drive ribbons 86' are substantially identical to the driving ribbons 86 heretofore described with the exception that they are provided with a plurality of apertures 200 which are spaced longitudinally along the ribbons 86'. The apertures 200 are engaged by cogs 202 on the surface of the roller 88'. Roller 88' is provided at its ends with spur gears 204 which are in meshed relationship with spur gears 206 respectively fixed at opposite ends of worm wheel 94'. Worm wheel 94' is in meshed relationship with worm 96' which may be rotated in the same manner in which worm wheel 96 in FIG. 10 is rotated, as was described hereinbefore. With the arrangement shown in FIG. 11, ribbons 86' are positively driven by means of the cogs 202 and the apertures 200 whereby to insure against slippage when the machine is operating under load.

It will be obvious in view of the foregoing paragraph that link belts, timing belts, and other suitable types of continuous flexible members may be employed to effect longitudinal surface movement along the mandrel 16 without departing from the spirit and scope of the present invention.

Various other features and modifications of the basic mechanism hereinbefore may be employed. For instance, a superior uniformity of resin impregnation is achieved if prior to the rovings 126 and 128 being immersed in the resin they are heated as by passing between a pair of parallel heated plates 160.

Another highly desirable modification of the present invention is the substitution for the bottom layer of roving 122 by a ribbon of thermoplastic material which will provide the plastic pipe 140 with a corrosion and waterproof lining to prevent "weep" as might occur if polyester were used to impregnate the rovings. Examples of suitable thermoplastics are polyvinyl chloride and polyethylene. The operation of the machine will be precisely the same save for the substitution of the thermoplastic ribbon for the roving 122.

In accordance with another modification of the present invention, the inner and outer surfaces of the pipe formed by machine 10 may be overlayed by random oriented fiber, either natural or synthetic. We presently prefer synthetic fibers and most preferably prefer random oriented acrylic fibers. These fibers may be introduced into the pipe in the form of a tape made up of random oriented fiber and preferably either prior to or at the time of introduction onto the mandrel the fibers are impregnated with resin, preferably the same resin as is used to impregnate the fiber glass rovings although different resins may be employed. By incorporating inner and outer layers of random oriented impregnated fibers, we have found that the corrosion resistance and erosion resistance of the final product are greatly increased over that possessed by a pipe having only layers of impregnated rovings.

It is also within the scope of the present invention to make the entire mandrel and associated parts removable and replaceable as a unit, whereby to adapt a single machine 10 to make plastic pipes of different diameters.

A machine 10 embodying some or all of the features described herein has vast utility. Not only may it be permanently located in a factory as would be expected, but in can readily be mounted on a vehicle to manufacture pipe and lay pipe directly from the end of the mandrel, the vehicle moving at a rate to let the pipe fall smoothly into place. This will not only result in a vest speedup in pipe laying procedure, but will obviate the necessity of shipping bulky pipe to the site where it is to be laid, only the relatively compact raw materials needing to be shipped.

Although the machine 10 together with all the modifications thereof has been described as being used in conjunction with a cylindrical mandrel, it will be understood that the present invention may be readily employed to manufacture rectangular and polygonal pipe. All that need be done to adapt the machine for such use is to shape the main mandrel member 60 into the form desired for the final product. That is, if a square pipe is desired, member 60 should be square and if a hexagonal pipe is desired, member 60 should be hexagonal in cross section. With this one change the mandrel construction described hereinbefore may be employed to make the final product.

Having thus described this invention, it will be obvious that various changes and modifications may be made therein within the scope of the appended claims without departing from the spirit and scope of this invention.

Having now described our invention, what we claim as new and desire to secure by Letters Patent is:

1. In apparatus for making tape reinforced plastic pipe, a mandrel comprising a longitudinally extending tubular member, a plurality of circumferentially spaced rollers disposed adjacent one end of said tubular member, another plurality of circumferentially spaced rollers disposed adjacent the other end of said tubular member, a plurality of continuous ribbons having circumferentially spaced portions overlying the outer surface of said tubular member and having other circumferentially spaced portions extending through said tubular member, each of said ribbons operatively engaging a roller at each end of said tubular member, and means for rotating the plurality of rollers at one end of said tubular member for imparting linear movement to said ribbons.

2. In apparatus for making tape reinforced plastic pipe, a mandrel comprising a longitudinally extending rotatable tubular member supported adjacent only one end thereof, means for rotating said tubular member about its longitudinal axis, a plurality of circumferentially spaced rollers disposed adjacent one end of said tubular member and being rotatable about axes extending transversely of the longitudinal axis of said tubular member, another plurality of circumferentially spaced rollers disposed adjacent the other end of said tubular member and being rotatable about axes extending transversely of the longitudinal axis of said tubular member, a plurality of continuous ribbons having circumferentially spaced portions overlying the outer surface of said tubular member and having other circumferentially spaced portions extending through said tubular member, each of said ribbons operatively engaging a roller at each end of said tubular member, and drive means operatively connecting said plurality of rollers at one end of said tubular member to said tubular member for imparting rotation to said last mentioned plurality of rollers about their respective axes in response to rotation of said tubular member about its longitudinal axis whereby to impart longitudinal linear movement to said plurality of ribbons relative to said tubular member.

3. In apparatus for making tape reinforced plastic pipe, a mandrel comprising a longitudinally extending tubular member, a continuous ribbon having a portion overlying the outer surface of said tubular member and another portion extending through said tubular member, said ribbon being movable longitudinally of said tubular member, and a wrapper spirally wound on said tubular member and overlying said first mentioned portion of said ribbon, whereby when said ribbon moves longitudinally of said tubular member, said wrapper moves along with said ribbon, said wrapper being adapted to engage the inner surface of said plastic pipe during the formation thereof for moving said pipe therewith and being disengageable from said inner surface of said plastic pipe after formation thereof.

4. In apparatus for making tape reinforced plastic pipe, a mandrel comprising a longitudinally extending tubular member, a continuous ribbon having a portion overlying the outer surface of said tubular member and another portion extending through said tubular member, said ribbon being movable longitudinally of said tubular member, and a continuous wrapper having a portion spirally wound over the outer surface of said tubular member and the portion of said ribbon overlying the outer surface of said tubular member and having another portion extending through said tubular member, whereby when said ribbon moves longitudinally of said tubular member the portion of said wrapper overlying said tubular member moves along with said ribbon and the portion of said wrapper disposed within said tubular member moves in the opposite direction, the portion of said wrapper overlying said tubular member and ribbon being adapted to engage the inner surface of said plastic pipe during the formation thereof for moving said pipe therewith and being disengageable from said inner surface of said plastic pipe after formation thereof.

5. In apparatus for making tape reinforced plastic pipe, a mandrel comprising a first longitudinally extending tubular member, a second longitudinally extending tubular member disposed within said first tubular member and spaced therefrom, a continuous ribbon having a portion overlying the outer surface of said first tubular member and another portion extending between said first and second tubular members, said ribbon being movable longitudinally of said first and second tubular members, and a continuous wrapper having a portion spirally wound over the outer surface of said first tubular member and the portion of said ribbon overlying the outer surface of said first tubular member, and having another spirally wound portion extending through said second tubular member, whereby when said ribbon moves longitudinally of said first tubular member the portion of said wrapper overlying said first tubular member moves along with said ribbon and the portion of said wrapper disposed within said second tubular member moves in the opposite direction, the portion of said wrapper overlying said first tubular member and ribbon being adapted to engage the inner surface of said plastic pipe during the formation thereof for moving said pipe therewith and being disengageable from said inner surface of said plastic pipe after formation thereof.

6. In apparatus for making tape reinforced plastic pipe, a mandrel comprising a longitudinally extending rotatable tubular member supported adjacent only one end thereof, means for rotating said rotatable tubular member about its longitudinal axis, a fixed longitudinally extending tubular member disposed within said rotatable tubular member and spaced therefrom, a continuous ribbon having a portion overlying the outer surface of said rotatable tubular member and another portion extending between said fixed and rotatable tubular members, said ribbon being movable longitudinally of said rotatable tubular member, and a continuous wrapper having a portion spirally wound over the outer surface of said rotatable tubular member and the portion of said ribbon overlying the outer surface of said rotatable tubular member and having another spirally wound portion extending through said fixed tubular member, whereby when said ribbon moves longitudinally of said rotatable tubular member the portion of said wrapper overlying said rotatable tubular member moves along with said ribbon, and the portion of said wrapper disposed within said fixed tubular member moves in the opposite direction, the portion of said wrapper overlying said rotatable tubular member and ribbon being adapted to engage the inner surface of said plastic pipe during the formation thereof for moving said pipe therewith and being disengageable from said inner surface of said plastic pipe after formation thereof.

7. In apparatus for making tape reinforced plastic pipe, a mandrel comprising a longitudinally extending rotatable tubular member supported adjacent only one end thereof, means for rotating said tubular member about its longitudinal axis, a plurality of circumferentially spaced rollers disposed adjacent one end of said tubular member and being rotatable about axes extending transversely of the longitudinal axis of said tubular member, another plurality of circumferentially spaced rollers disposed adjacent the other end of said tubular member and being rotatable about axes extending transversely of the longitudinal axis of said tubular member, a plurality of continuous ribbons having portions overlying the outer surface of said tubular member and having other portions extending through said tubular member, each of said ribbons operatively engaging a roller at each end of said tubular member, and drive means operatively connecting said plurality of rollers at said one end of said tubular member to said tubular member for imparting rotation to said plurality of rollers at said one end of said tubular member about their respective axes in response to rotation of said tubular member about its longitudinal axis whereby to impart longitudinal linear movement to said plurality of ribbons relative to said tubular member, and a wrapper spirally wound on said tubular member and overlying said first mentioned portion of said ribbon, whereby when said ribbons move longitudinally of said tubular member said wrapper moves along with said ribbons, said wrapper being adapted to engage the inner surface of said plastic pipe during the formation thereof for moving said pipe therewith and being disengageable from said inner surface of said plastic pipe after formation thereof.

8. In apparatus for making tape reinforced plastic pipe, a mandrel comprising a longitudinally extending rotatable tubular member supported adjacent only one end thereof, means for rotating said tubular member about its longitudinal axis, a fixed longitudinally extending tubular member disposed within said rotatable tubular member and spaced therefrom, a plurality of circumferentially spaced rollers disposed adjacent one end of said rotatable tubular member and being rotatable about axes extending transversely of the longitudinal axis of said rotatable tubular member, another plurality of circumferentially spaced rollers disposed adjacent the other end of said rotatable tubular member and being rotatable about axes extending transversely of the longitudinal axis of said rotatable tubular member, a plurality of continuous ribbons, one for each roller at one end of said rotatable tubular member, each of said ribbons being in operative relationship with a roller at each end and having a portion overlying the outer surface of said rotatable tubular member and another portion extending between said two tubular members, drive means operatively connecting said plurality of rollers at said one end of said rotatable tubular member to said rotatable tubular member for imparting rotation to said last mentioned plurality of rollers about their respective axes in response to rotation of said rotatable tubular member about its longitudinal axis whereby to impart longitudinal linear movement to said plurality of ribbons relative to said rotatable tubular member, and a continuous wrapper having a portion spirally wound over the outer surface of said rotatable tubular member and the portions of said ribbons overlying the outer surface of said rotatable tubular member and having another spirally wound portion extending through said fixed tubular member, whereby when said ribbons move longitudinally of said rotatable tubular member the portion of said wrapper overlying said rotatable tubular member moves along with said ribbon and the portion of said wrapper disposed within said fixed tubular member moves in the opposite direction, the portion of said wrapper overlying said rotatable tubular member and ribbons being adapted to engage the inner surface of said plastic pipe during the formation thereof for moving said pipe therewith and being disengageable from said inner surface of said plastic pipe after formation thereof.

References Cited in the file of this patent
UNITED STATES PATENTS

| | | |
|---|---|---|
| 2,331,696 | Friedrichs et al. | Oct. 19, 1943 |
| 2,402,038 | Goldman et al. | June 11, 1946 |
| 2,674,557 | Boggs | Apr. 6, 1954 |
| 2,714,414 | De Ganahl et al. | Aug. 2, 1955 |
| 2,723,705 | Collins | Nov. 15, 1955 |
| 2,742,931 | De Ganahl | Apr. 24, 1956 |
| 2,748,805 | Winstead | June 5, 1956 |
| 2,748,830 | Nash et al. | June 5, 1956 |
| 2,777,501 | Fischer | Jan. 15, 1957 |